Aug. 17, 1937.   G. E. PORTER   2,090,152
CLUTCH ACTUATOR
Filed Aug. 22, 1934   3 Sheets-Sheet 1

INVENTOR
Gilbert E. Porter
BY
ATTORNEYS

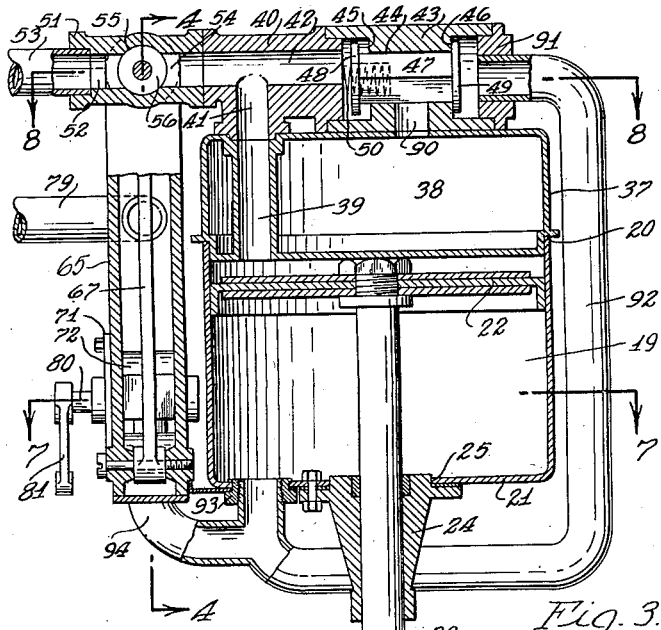

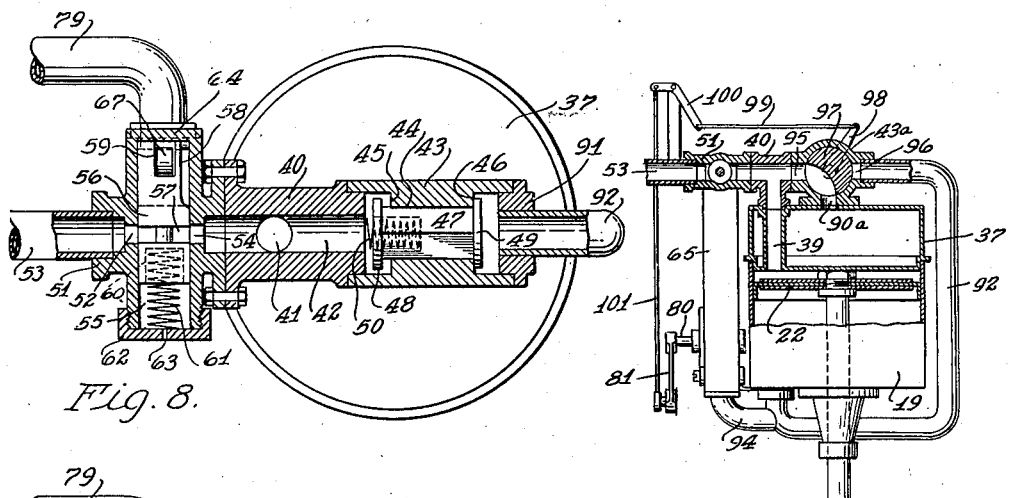
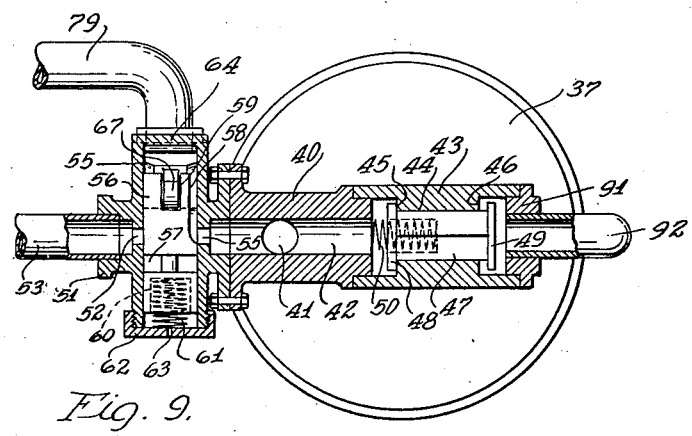
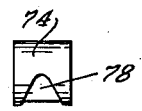
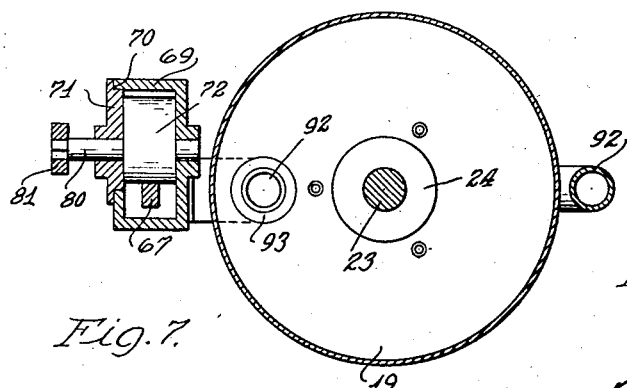
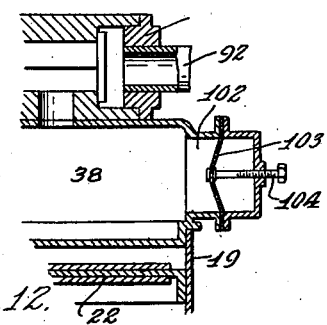

Patented Aug. 17, 1937

2,090,152

UNITED STATES PATENT OFFICE 2,090,152

CLUTCH ACTUATOR

Gilbert E. Porter, Detroit, Mich.

Application August 22, 1934, Serial No. 740,882

26 Claims. (Cl. 192—.01)

The present invention pertains to a novel clutch actuator of a type deriving its motivating force through connection with the partial vacuum present in the intake manifold of an automotive vehicle engine, and personally operable controls for the actuator which function to permit a vehicle operator to control the actuator in a manner to simulate the operation of a conventional manually operated clutch.

Since the advent of the power actuated master clutches on automotive vehicles, and particularly those which depend for their operation upon the partial vacuum in the intake manifold of the vehicle engine, it has been learned that a continuous movement of the power device, and a resulting continuous movement of the clutch parts from their fully retracted, or disengaged position, to their fully engaged position, is not desirable in the interest of smooth operation and is not practical, in the interest of economy and long useful service. An important objection to such a mode of operation is that it constitutes a departure from the mode of operation of a conventional, manually operated clutch, inasmuch as a skillful operator, when employing a manual clutch, causes the clutch parts to engage more slowly when the vehicle is stationary or moving at a low rate of speed, and more rapidly when the vehicle is moving at a higher rate of speed in order to provide for smooth operation of the vehicle. Furthermore, a constant rate of clutch engagement movement for each successive operation of the clutch is impractical for the reason that it does not adapt the clutch engagement to the different conditions presented during operation of the vehicle, an example of such varying conditions being when it occurs to the operator to start the vehicle in second gear, or to cause a transmission shift from first to third gears. The conditions thus presented require a different rate of clutch engagement than required when the conventional routine of shifting from first to intermediate to third gears, and a skillful vehicle operator, employing a manual clutch, or in other words a pedally operated clutch, controls the clutch engagement to meet these and various other vehicle operation conditions more or less automatically. Accordingly, it is the primary object of the present invention to provide a power device for actuating a master clutch, the function and controlling factors governing the functioning of the power device being similar in every respect to the function and controlling factors controlling the operation of a conventional pedally controlled clutch, and therefore to provide a clutch actuator which may be operated more or less automatically or subconsciously by an operator in a manner to meet all the varying conditions of vehicle operation.

Another important object of the present invention is to provide a clutch actuator which is adapted for operation through connection with the intake manifold of an automotive vehicle engine for moving parts of a master clutch into and out of engagement, the actuator being designed to function during engagement movement of the clutch parts to provide for a hesitation or a complete cessation of movement at the point of initial engagement of the clutch parts, and to move from the point of initial engagement to complete and full engagement of the clutch parts slowly or rapidly, depending upon the rapidity at which the controls are caused to function by the operator. The rate of movement of the clutch parts, resulting from movement of the actuator, from their fully retracted or disengaged position to their position of initial engagement is the same in each successive operation, but the rate of movement of the clutch parts from their position of initial engagement to their position of full engagement may be varied according to the will of the operator inasmuch as it is made directly dependent upon the rapidity of operation of the controls. Thus the device functions identically to the conventional pedal operated clutch wherein the rate of engagement is directly governed by the rapidity of operation of the pedal.

It has been proposed by different prior devices to connect the controls of suction operated clutch actuators with the accelerator or throttle pedal of the vehicle, with the result that the clutch is caused to be disengaged only when the accelerator or throttle pedal is in, or in close proximity to, its fully retarded position. An important disadvantage in such an arrangement is that during the movement of the accelerator pedal from an operating position to its retarded position in order to cause the clutch to be disengaged, the deceleration of the engine has a temporary braking effect upon the vehicle, with the result that a sudden drag or check in the movement of the vehicle precedes each free wheeling operation. A further disadvantage is that the engine, under closed throttle, cannot be utilized as a brake to check the momentum of the vehicle inasmuch as closing of the throttle is accompanied by disengagement of the clutch. Accordingly, it is another important object of the present invention to provide a clutch actuator which may be caused to function to disengage the clutch simultaneously with the initiation of deceleration movement of the throttle pedal, and which may be caused to function whereby the clutch remains engaged while the throttle pedal is being moved in a direction causing deceleration of the engine and which may be caused to function whereby the clutch may remain engaged while the engine is operating under closed throttle. In this connection the invention provides a novel arrangement and association of the clutch actuator control pedal, the accelerator pedal, and the conventional brake pedal, the said arrangement permitting the several pedals to be operated singly, or the clutch control pedal to be operated in unison with either accelerator or brake pedal.

Still another object of the present invention is to provide a manually controlled clutch actuating device, the function of the device being such that upon operation of the control to cause clutch engagement movement of the clutch parts an interruption or hesitation automatically occurs in the said movement at a point between the fully disengaged position and the fully engaged position of the clutch parts, the duration of the interruption or hesitation being governed directly by the rapidity of movement of the control means, and means in combination with the structure for so functioning for causing the interruption or hesitation to occur at the point of initial engagement of the clutch parts. The adjusting means for regulating the point at which the hesitation in the clutch engagement movement occurs is shown as embodied in two different forms, both of which are designed to permit an actuating unit being installed with various clutch throws now in common use and to permit adjustments being made to overcome changing conditions resulting from prolonged use, wear being one of the important factors in making such adjustments necessary.

With the above and other ends in view the invention is more particularly pointed out with reference to the accompanying drawings, in which Figure 1 is a side elevation of the present actuator associated with an automobile engine and illustrating the control parts therefor;

Fig. 3 is a vertical cross section of the power unit;

Fig. 4 is a cross section taken on the line 4—4 of Fig. 3;

Fig. 5 is a vertical cross section of the power unit with the parts thereof in another stage of operation;

Fig. 6 is a cross section taken on the line 6—6 of Fig. 5;

Fig. 7 is a cross section taken on line 7—7 of Fig. 3;

Figs. 8 and 9 are cross sections taken on lines 8—8 and 9—9 of Figs. 3 and 5 respectively;

Fig. 10 is an elevation of a detail;

Fig. 11 is a vertical cross section illustrating a modified form of valve structure, and Fig. 12 is a fragmentary vertical cross section illustrating an adjusting element.

Figure 1:
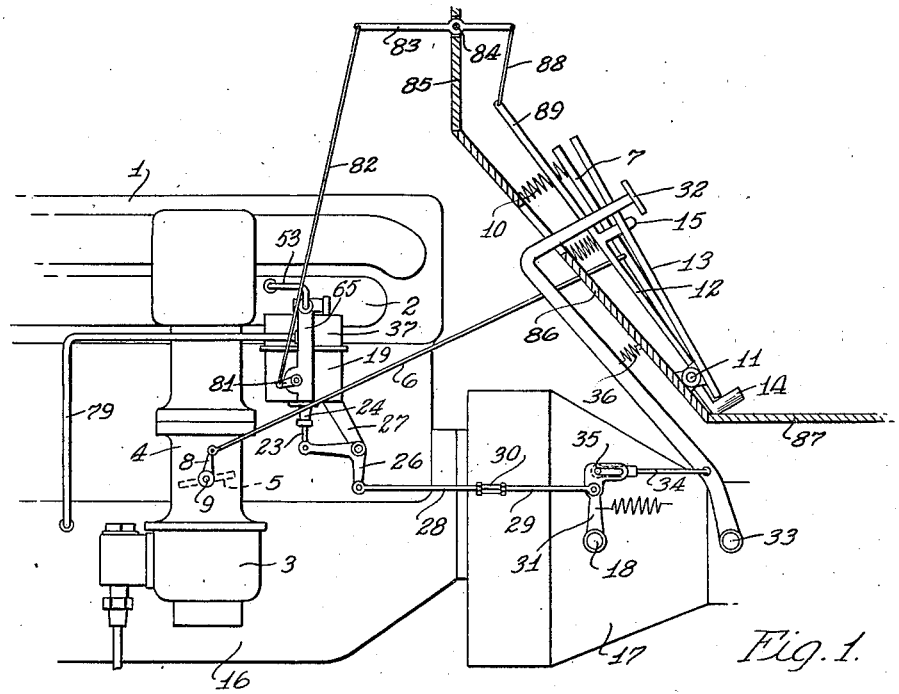

Referring to Fig. 1, the numeral 1 designates an automotive vehicle engine having the usual intake manifold 2 connected with a carburetor 3 through means of a tubular element 4. In the tubular element 4 is mounted a butterfly valve 5, in accordance with conventional carburetor constructions, and a rod 6 is connected at one end to a throttle or accelerator pedal 7 and at its other end to a lever 8 on a shaft 9 which supports the valve 5. Spring means 10 as shown, by way of example, for holding the accelerator pedal 7 in a position maintaining the valve 5 closed in the absence of pressure, such as by the operator placing his foot upon the pedal.

Figure 2:
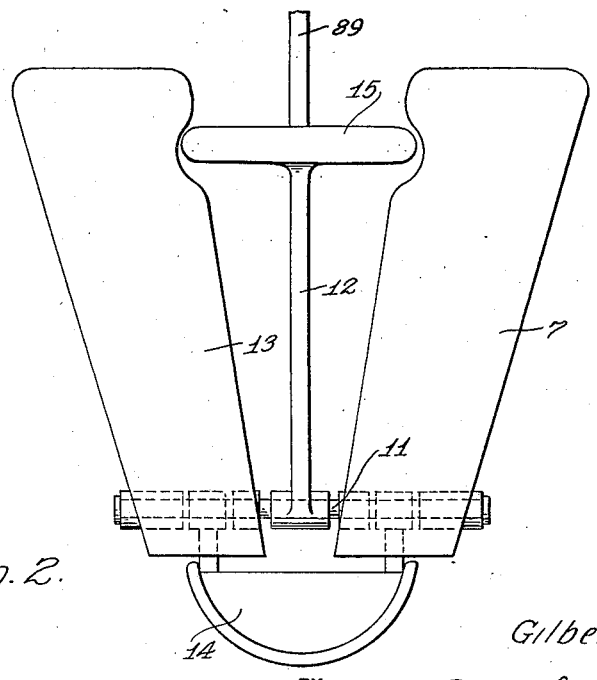
Fig. 2 is an elevation of the actuator control associated with throttle and brake pedals;
50

As more clearly shown in Fig. 2, the pedal 7 is supported by a shaft 11, and also supported by the shaft 11 is a lever 12 and a brake pedal 13. A heel rest 14 is provided for supporting an operator's foot so that movement of the operator's foot from the pedal 7 to pedal 13 may be easily accomplished. The lever 12 is disposed between the pedals 7 and 13 and is provided with a tread portion so arranged that it may be engaged by the foot of the operator at the same time the foot is in engagement with one or other of the pedals 7 or 13, or it may be engaged independently of pedals 7 and 13. The purpose of the lever 12 will become apparent as its association with the clutch actuator is described, and it will be understood that, while not illustrated, the pedal 13 represents the brake pedal such as is ordinarily employed to actuate the automotive vehicle brakes. The connection with the brakes has not been shown because it forms no part of the invention, and because it may be associated with any well known types of brakes such as manual, hydraulic, pneumatic or power actuated.

The numeral 16 designates the crank case of the engine and 17 the clutch housing. Mounted in the clutch housing is a clutch throw out shaft 18 which operates upon rotation in one direction to disengage a clutch contained within the housing, and upon rotation in the other direction to permit springs in the clutch mechanism to cause engagement thereof. Inasmuch as clutch mechanisms are well known to those versed in the art to which the present invention pertains no particular clutch mechanism has been illustrated here, it being understood, however, that the clutch is of the type normally engaged and requiring the application of pressure from an external source in order to disengage the same.

Supported adjacent to the engine 1 in any suitable manner is a cylinder 19 having an open upper end 20 and an integral wall 21 closing its lower end. Slidably received in the cylinder 19 is a piston 22 having a rod 23 connected thereto and extending through a fitting 24 which is mounted in an aperture 25 in the wall 21. The free end of the rod 23 is connected to one end of a bell crank lever 26 which is pivotally supported by a bracket 27 depending from the cylinder 19. Connected to the other end of the bell crank lever 26 is a rod 28 whose other end is adjustably connected to a rod 29 by a turnbuckle 30, the other end of the rod 29 being connected to a lever 31 on the clutch throw out shaft 18. A clutch pedal 32 is pivotally supported as at 33 on the clutch housing 17 and is connected to the lever 31 by a rod 34 having a slot and pin connection 35 as indicated.

At this stage of the description it becomes apparent that movement in one direction of the piston 22, when transmitted through the above described linkage, results in movement of the lever 31, and therefore rotation of the shaft 18 to engage or disengage the clutch as the case may be. However, it will be noticed that movement of 7 lever 31 in this manner can take place without causing movement of the clutch pedal 32, due to the slot and pin connection 35 and a spring 36, which resiliently urges the pedal 32 to its raised position. Movement of pedal 32, as a result of 7 application of pressure thereon by the foot of an operator, also causes lever 31 to rock the shaft 18 to disengage the clutch.

The upper open end of the cylinder 19 is provided with a closure in the form of a hollow head 37 providing an air chamber 38 for a purpose which will hereinafter appear. A conduit 39 whose opposite ends open through the upper and lower walls respectively of the head 37, thus providing an air passage through the head without communication with the chamber 38 in the head. Secured on top of the head 37 is a T fitting 40 having a passage 41 communicating with the conduit 39, and with a passage 42 which extends horizontally from end to end of the fitting 40. One end of the fitting 40 is connected into a valve housing 43 which is formed with a horizontally extending bore 44 and valve seats 45 and 46 at opposite ends of the bore. The bore 44 communicates with the chamber 38 in the head 37 through a port 90. Slidable loosely in the bore 44 is an angular valve stem 47 having valve heads 48 and 49 on opposite ends thereof and adapted to cooperate with the valve seats 45 and 46 respectively. The stem 47 is formed of a length greater than that of the bore 44 and a coiled spring 50 normally urges the valve stem to a position where the valve head 48 engages the seat 45. In other words, the valves 48 and 49 are spring biased so that the valve 48 is normally seated and valve 49 is normally unseated.

Secured to the other end of the fitting 40 is a valve housing 51 having a passage 52, connected by a pipe line 53 to the intake manifold 2, and a co-axial passage 54 communicating with the passage 42 in the fitting 40. Both passages 52 and 54 open into a bore 55 whose axis extends in the same horizontal plane but at right angles to the axes of passages 52 and 54. Slidably received in the bore 55 is a valve plug 56 having an annular groove 57 adapted to be aligned with passages 52 and 54, by moving the plug, to establish communication therebetween as illustrated more clearly in Figs. 3 and 8, and the plug is adapted to be moved to the position shown in Figs. 5 and 9 wherein it blocks off communication between the passages 52 and 54. The plug 56 has a portion thereof removed to provide a relief 58 and when the valve plug is in the position where it blocks off communication between passages 52 and 54 the end of the relief 58 is in register with the passages 54. One end of the valve plug 56 is provided with a slot 59 and the other end is recessed as at 60 to receive a compressed coil spring 61 whose outer end engages a removable cap 62 which closes the outer end of the bore 55, the cap being provided with a vent 63. The other end of the bore 55 is closed by an integral end wall 64 and the spring 61 resiliently urges the valve plug 56 toward the end wall 64.

The valve housing 51 is formed with an integral hollow extension 65 whose lower end is sealed by a plate 66. Pivotally mounted in the hollow extension 65 is an elongated lever 67, the pivotal support for the lever being in the form of a removable pin 68. The upper end of the lever 67 is received in the slot 59 in the valve plug 56 so that when the lever is moved from the position shown in Fig. 4 to that shown in Fig. 6, in a manner to be hereinafter described, the valve plug 56 is caused to be moved longitudinally. The extension 65 has an arcuate portion 69 having an opening 70 providing for access thereto, and a removable cover plate 71 providing a closure for the opening. Rotatably journalled in the arcuate portion 69 is a cam element 72 adapted, as shown more clearly in Figs. 4 and 6, to engage the lever 67. Formed in the arcuate portion 69 is a port 73 and a valve element 74 has a tubular part 75 received slidably in a bore 76 in the cam element 72 and a compressed spring 77 normally urges the valve element into engagement with the inner surface of the arcuate portion 69. It becomes obvious therefore, that the valve element 74 is carried by the rotatable cam element 72 so that at one stage of rotation of the latter the valve element covers the port 73. The outer surface of the valve element 74 is provided with a tapered groove 78 as shown in Fig. 10. Opening into the side of the hollow extension 65 at a point above the arcuate portion 69 is a pipe line 79, the other end of the pipe line 79 being connected into the crank case 16 of the engine 1.

The rotatable cam element 72 is supported upon a shaft 80 whose end extends through the plate 71 and upon which is provided a lever 81. As shown in Fig. 1 the lever 81 is connected by a rod 82 to one end of a lever 83 which is fulcrumed as at 84 in the automobile body structure 85 above the inclined toe board 86 and flat floor board 87, the fulcrum of the lever being at a point between its ends. The other end of lever 83 is connected by a link 88 to an arm 89 on the lever 12.

The outer end of the valve housing 43 is closed by a plug 91 through which the end of a conduit 92 extends, the other end of the conduit opening through a suitable fitting 93 through the bottom wall 21 into the cylinder 19. A conduit 94 has one end tapped into the conduit 92 and its other end communicating with the port 73.

In describing the operation it will be assumed that the engine 1 is operating, that a partial vacuum is present in the intake manifold and that the parts are positioned as shown in Figs. 1 and 3. At the stage of operation thus illustrated the valve plug 56 is positioned so that the groove 57 therein is in register with passages 52 and 54 and, due to the fact that passage 52 is in communication with the intake manifold, air is withdrawn from the cylinder 19 above the piston 22. At the same time air at atmospheric pressure entering the extension 65 passes through the arcuate portion 69, port 73, conduit 94 and conduit 92 to enter the cylinder 19 beneath the piston and the differential pressure on opposite sides of the piston tends to maintain it in the position shown. The suction present in passage 42 tends to unseat valve head 48 from its seat 45 and the air in chamber 38 is withdrawn through bore 44 and port 90. Due to the fact that atmospheric pressure is present in conduit 92 the valve head 49 will be held on its seat after the air has been exhausted from the chamber 38. At this stage of the operation the position of the piston is such that it holds the clutch contained in housing 17 in disengaged position through the linkage and in a manner heretofore described.

The next stage in the function of the device is caused by movement of the lever 12, such as takes place when the operator places his foot upon the tread member 15. Movement of the lever 12 causes the lever 83 to rock, and the latter moves the rod 82 and lever 81 to partially rotate the cam element 72. Upon rotation of the cam element 72 the lever 67 is rocked from the position shown in Fig. 4 to that shown in Fig. 6, and the valve element 74 is moved to a position where it covers the port 73. The valve plug 56 is moved to a position where it covers the passage 52 so as to close off communication of any part of the device with the intake manifold. At this time air at atmospheric pressure entering the hollow extension 65 through line 79 enters the bore 55 and because the relieved part 58 of the valve plug is in register with the passage 54 the air leaves the bore 55 through passages 54 and 40 and enters the cylinder 19 above the piston 22 through the conduit 39. Due to the fact that atmospheric pressure is present in both ends of the valve housing 43 the spring 50 moves the valve stem 47 to a position where valve 48 seats on seat 45 and valve 49 is unseated from seat 46. With the valve 49 unseated the air in cylinder 19 beneath the piston 22 passes through conduit 92 to replace the air previously withdrawn from chamber 38 as above described. The piston 22 then moves downwardly until a balanced pressure condition is present on both sides thereof, at which time it comes to rest. It will be understood that the above mentioned springs which urge the clutch parts to their engaged position also have a tendency to move the piston 22 downwardly in order to permit engagement of the clutch.

The turnbuckle 30 is so adjusted relative to the rods 28 and 29 that the clutch parts will be partially or initially engaged at the point where the piston 22 comes to rest. The clutch parts are not, however, fully engaged at this point and in order to complete the engagement further movement of the piston 22 is necessary. This necessary additional movement of piston 22 is positively prevented due to the air trapped in the cylinder 19 beneath the piston, in the conduits 92 and 94, and in the auxiliary chamber 38. Continued movement of lever 12 and of cam element 72 causes the valve element 74 to move to a position where the slot 78 is in register with port 73 or until the valve element completely passes port 73. In either event the air trapped beneath the piston 22 passes through conduit 94 and port 73 into the hollow extension 65 and the rate at which this air is permitted to pass governs the rate of movement of the clutch from its point of initial engagement to complete engagement. It is obvious, therefore, that bleeding of the air will be slow if movement of the valve element 74 is slow and if the valve element is moved past the port 73 rapidly the bleeding action, and consequently final and complete clutch engagement, will take place more rapidly.

Accordingly, if the operator wishes the clutch to engage slowly, movement of lever 12 must be at a correspondingly low rate, but in the event that it is desirable that the clutch be engaged rapidly movement of lever 12 should be correspondingly rapid. When the clutch is finally engaged it can be maintained engaged by holding the lever 12 depressed and such a feature is desirable under certain conditions of operating automotive vehicles. Furthermore the arrangement of treadle 15 in the particular association with the accelerator and brake pedals makes it possible to attain free wheeling without any irregularity in the movement of the vehicle and makes it possible to utilize the engine as a brake while the brake pedal is depressed. Such an arrangement furthermore provides the advantages of a clutch actuator which automatically operates upon movement of the accelerator inasmuch as lever 12 and pedal 7 may be operated in unison, yet it retains the feature wherein the will of the operator can dominate its function, with the result that certain known above mentioned undesirable features of the automatic function are avoided.

In Fig. 11 there is shown another valve structure for replacing the automatically functioning valve described as being received in the housing 43, the remainder of the structure being the same as described above and therefore not described here because such a description would merely amount to duplication. Therefore, for an understanding the same reference numerals may be referred to with the exception of the valve housing 43a which communicates with chamber 38 through a port 90a, the housing 43a being provided with ports 95 and 96 respectively, communicating with ports 42 and conduit 92. Communication between port 95 and port 90, and between port 90 and 96 is controlled by a rotatable valve plug 97 having a lever 98 for operating the same. The lever 98 is connected by a rod 99 to an end of a bell crank lever 100, the other end of the bell crank lever being connected by a rod 101 to the lever 81 which controls the movement of the cam element 72. Thus the cam element 72 and valve 97 are positively connected together to move in unison.

In Fig. 12 there is shown an adjustment means for regulating the point at which the piston 22 comes to rest, this means being adapted for use in lieu of the turnbuckle 30. The means comprises a tubular extension 102 on the head 37 and communicating with the chamber 38. In the extension is mounted a flexible diaphragm 103 and a set screw 104 for regulating the diaphragm so as to regulate the combined volume of the chamber 38 and the extension 102.

Although specific embodiments of the invention have been shown and described it will be understood that various changes may be made within the scope of the appended claims without departing from the spirit of the invention, and such changes are contemplated.

What I claim is:

1. In a clutch actuator adapted to be operated by differential pressures in opposite sides thereof, means for connecting one side of said actuator to a source of low air pressure and then to a source of higher air pressure, means rendered operative when said actuator is connected to said source of higher pressure for withdrawing a measured amount of air from the other side of said actuator, and means to be operated after said measured amount of air has been withdrawn from said actuator for opening said other side of said actuator to the atmosphere.

2. In a clutch actuator adapted to be operated by differential pressures in opposite sides thereof, means for connecting one side of said actuator to a source of suction and then to air at atmospheric pressure, means rendered operative when said actuator is connected to the atmosphere for withdrawing a measured amount of air from the other side of said actuator, and means to be operated after said measured amount of air has been withdrawn for opening the said other side of said actuator to the atmosphere.

3. In a clutch actuator adapted to be operated by differential pressures in opposite sides thereof, means for connecting one side of said actuator to a source of suction, and then to air at atmospheric pressure, means rendered operative when said actuator is connected to the atmosphere for withdrawing a measured amount of air from the other side of said actuator, said second named means including regulating means for adjustably varying the amount of air withdrawn, and means to be operated after said measured amount of air has been withdrawn for opening the said other side of said actuator to the atmosphere.

4. In a clutch actuator adapted to be operated by differential pressures in opposite sides thereof, means for connecting one side of said actuator to a source of suction and then to air at atmospheric pressure, means rendered operative when said actuator is connected to the atmosphere for withdrawing a measured amount of air from the other side of said actuator, and manually operable means for controlling the action of the first two said means and for connecting the other side of said actuator to the atmosphere.

5. In a clutch actuator adapted to be operated by differential pressures in opposite sides thereof, means for connecting one side of said actuator to a source of suction and then to air at atmospheric pressure, means rendered operative when said actuator is connected to the atmosphere for withdrawing a measured amount of air from the other side of said actuator, and manually operable means for controlling the action of the first two said means and for connecting the said other side of said actuator to the atmosphere, said manually operable means including a bleeder element for regulating the rate at which the remaining air in said other side of the actuator escapes into the atmosphere.

6. In a clutch actuator adapted to be operated by differential pressures in opposite sides thereof, an auxiliary chamber, means for connecting one side of said actuator and said auxiliary chamber with a source of suction and for connecting said actuator with atmospheric air, means for disconnecting said auxiliary chamber from said source of suction and for simultaneously connecting it with the other side of said actuator, and means operable after said other side has been connected with said auxiliary chamber for connecting said other side with the atmosphere.

7. In a clutch actuator adapted to be operated by differential pressures in opposite sides thereof, an auxiliary chamber, means for varying the volumetric capacity of said auxiliary chamber, means for connecting one side of said actuator and said auxiliary chamber with a source of suction and for connecting said actuator with atmospheric air, means for disconnecting said auxiliary chamber from said source of suction and for simultaneously connecting it with the other side of said actuator when said first named means connects said actuator with the atmosphere, and means operable after said other side has been connected with said auxiliary chamber for connecting said other side with the atmosphere.

8. In a clutch actuator adapted to be operated by differential pressure in opposite sides thereof, a control pedal for said actuator, an auxiliary chamber, a source of suction, a source of air at atmospheric air pressure, means automatically rendered operative when said pedal is in a retracted position for connecting one side of said actuator and said auxiliary chamber with said source of suction and for connecting the said side of said actuator with said source of atmospheric air pressure and for connecting the other side of said actuator with said auxiliary chamber upon movement of said pedal from its retracted position, and means operable upon continued movement of said pedal for connecting said other side of said actuator with the atmosphere.

9. A clutch actuator for use in combination with a source of suction, said actuator comprising a power device having a movable element which moves as a result of differential pressure in opposite sides of said power device, an auxiliary chamber, means for connecting one side of said power device and said auxiliary chamber with said source of suction, means for simultaneously connecting the other side of said power device with the atmosphere, means for disconnecting said power device and said auxiliary chamber from said source of suction, for simultaneously disconnecting said other side from the atmosphere and for simultaneously connecting it with said auxiliary chamber, and means for connecting said other side with the atmosphere.

10. In a clutch actuator, a casing, a movable element therein adapted to be moved by differential pressure in said casing, high and low pressure lines connected to one side of said casing, said high pressure line being connected to the other side of said casing, a valve at each side of said casing and controlling the lines connected to their respective sides, one of said valves being connected to a manual actuator, and means connecting said valves together whereby upon movement of said actuator they move simultaneously, said means including an element for causing movement of one of said valves at a rate faster than the other.

11. A mechanism for controlling the operation of a device adapted to be actuated by differential pressure, said mechanism comprising means communicating with one end of the device and adapted to alternately connect that end with sources of high and low pressures, means communicating with the other end of the device and normally connecting the said other end with said source of high pressure, said second named means being movable from its normal position to disconnect said other end from said high pressure source and to connect it with said high pressure source again as a result of further movement from its normal position, and means connecting said first and second named means whereby the initial movement of said second named means operates said first named means to disconnect said first named end of the device from the low pressure source and to connect it with the high pressure source.

12. A mechanism for controlling the operation of a device adapted to be actuated by differential pressure, said mechanism comprising means communicating with one end of the device and adapted to alternately connect that end with sources of high and low pressures, means communicating with the other end of the device and normally connecting the said other end with said source of high pressure, said second named means being movable from its normal position to disconnect said other end from said high pressure source and to again connect it with said high pressure source as a result of continued movement thereof away from its normal position, and means operatively connecting said first and second named means whereby actuation of said second named means causes actuation of said first named means to disconnect the first named end of the device from the low pressure source and to connect it with the high pressure source, said last named means causing movement of said first named means at a rate more rapidly than said second named means.

13. In a clutch actuator, a housing having both ends closed and a movable element disposed therein between said ends, a low pressure line, a high pressure line, a valve communicating with said high pressure line and one end of said housing, said valve normally providing communication between said high pressure line and the said end of said housing, said valve being movable and being adapted to prevent communication between said high pressure line and the said end of said housing during a predetermined fraction of said movement, a second valve normally connecting the other end of said housing with said low pressure line and adapted through movement thereof to connect the said other end of the housing with said high pressure line, and means operatively connecting said valves whereby the initial movement of the first named valve causes movement of the second named valve to connect the high pressure line with the said other side.

14. In a clutch actuator, a housing having both ends closed and a movable element disposed therein between said ends, a low pressure line, a high pressure line, a valve communicating with said high pressure line and one end of said housing, said valve normally providing communication between said high pressure line and the said end of said housing, said valve being movable and being adapted to prevent communication between said high pressure line and the said end of said housing during a predetermined fraction of said movement, a second valve normally connecting the other end of said housing with said low pressure line and adapted through movement thereof to connect the said other end of the housing with said high pressure line, and means operatively connecting said valves whereby actuation of said first named valve causes actuation of the second named valve at a more rapid rate of speed than said first named valve.

15. A mechanism for controlling the operation of a device to be actuated by a differential pressure, said mechanism comprising means communicating with one end of said device and adapted to alternately connect that end with a source of high pressure and with a source of low pressure, means communicating with the other end of the device and normally connecting the said other end with said source of high pressure, said second named means being movable from its normal position to disconnect the said other end of the device from said high pressure source, metering means in said second named means for gradually connecting the said other end with said high pressure source as a result of continued movement thereof away from its normal position, and means connecting said first and second named means whereby the initial movement of said second named means operates said first named means to disconnect the first named end of said device from said source of low pressure and to connect it with the high pressure source.

16. A mechanism for controlling the operation of a device to be actuated by a differential pressure, said mechanism comprising means communicating with one end of said device and adapted to alternately connect that end with a source of high pressure and with a source of low pressure, means communicating with the other end of the device and normally connecting the said other end with said source of high pressure, said second named means being movable from its normal position to disconnect the said other end of the device from said high pressure source, metering means in said second named means for gradually connecting the said other end of the device with said high pressure source as a result of continued movement thereof away from its normal position, and means connecting said first and second named means whereby movement of said second named means actuates said first named means to disconnect the first named end of said device from said source of low pressure and to connect it with the high pressure source, said last named means causing actuating movement of said first named means at a rate more rapidly than said second named means.

17. In combination with a clutch actuating element and resilient means urging said element to a position of clutch engagement, a clutch actuator housing having both ends closed, a movable element disposed in said housing between said ends and having means connecting the same to said actuating element, a valve normally connecting one end of said housing with a suction port and adapted to be moved to connect said end with the atmosphere, a second valve normally connecting the other end of said housing with the atmosphere, said second valve being movable and adapted to disconnect said other side from the atmosphere during a predetermined fraction of its movement, means for moving said second valve, and means connecting said valves whereby they move simultaneously to cause the first named valve to connect the first mentioned end of said housing with the atmosphere at a point in advance of the point in the movement of the second named valve where it disconnects the said other end of the housing from the atmosphere, and whereby the first valve maintains the first mentioned side in connection with the atmosphere during continued movement of said second named valve.

18. In combination with a clutch actuating element and resilient means urging said element to a position of clutch engagement, a clutch actuator housing having both ends closed, a movable element disposed in said housing between said ends and having means connecting the same to said actuating element, a valve normally connecting one end of said housing with a suction port and adapted to be moved to connect said end with the atmosphere, a second valve normally connecting the other end of said housing with the atmosphere, said second valve being movable and adapted to disconnect said other side from the atmosphere during a predetermined fraction of its movement, means for moving said second valve, and means connecting said valves whereby the first named valve moves more rapidly than the second valve upon movement of the latter.

19. In a clutch actuator, a movable element, means connecting said movable element to a clutch throw having yieldable means urging it toward a position of clutch engagement, high and low pressure means, means for controlling the admittance into said actuator of different pressures from said high and low pressure means to create a differential pressure in said actuator which moves said movable element and clutch throw to a position of clutch disengagement, means for controlling the admittance into said actuator of different pressures from said high and low pressure means whereby the clutch throw urging means moves said throw and movable element toward a position of clutch engagement and for creating a differential pressure in said actuator which opposes said yieldable means after a predetermined movement of said movable element and finally stops movement of said movable element, and regulating means independent of said presssure control means for adjusting the point at which the movement of said movable element is stopped.

20. In a clutch actuator, movable element, means connecting said movable element to a clutch throw having resilient means urging it toward a position of clutch engagement, high and low pressure means, means for controlling the admittance into said actuator of different pressures from said high and low pressure means to create a differential pressure in said actuator which moves said movable element and clutch throw to a position of clutch disengagement, means for controlling the admittance into said actuator of different pressures from said high and low pressure means whereby the clutch throw resilient means moves said throw and movable element toward a position of clutch engagement and for subsequently creating a differential pressure which opposes said resilient means and stops movement of said movable element, an air chamber in communication with said actuator, and means for varying the volumetric capacity of the air chamber.

21. In a clutch actuator, a movable element, means connecting said movable element to a clutch throw having resilient means urging it toward a position of clutch engagement, high and low pressure means, means for controlling the admittance into said actuator of different pressures from said high and low pressure means to create a differential pressure in said actuator which moves said movable element and clutch throw to a position of clutch disengagement, means for controlling the admittance into said actuator of different pressures from said high and low pressure means whereby the clutch throw resilient means moves said throw and movable element toward a position of clutch engagement and for subsequently creating a differential pressure which opposes said resilient means and stops movement of said movable element, and regulating means for adjusting the point at which the movement of said movable element is stopped, said regulating means comprising a variable air cushioning device.

22. In a clutch actuator, a movable element, means connecting said movable element to a clutch throw having resilient means urging it toward a position of clutch engagement, high and low pressure means, means for controlling the admittance into said actuator of different pressures from said high and low pressure means to create a differential pressure in said actuator which moves said movable element and clutch throw to a position of clutch disengagement, means for controlling the admittance into said actuator of different pressure from said high and low pressure means whereby the clutch throw resilient means moves said throw and movable element toward a position of clutch engagement and for subsequently creating a differential pressure which opposes said resilient means and stops movement of said movable element, and means for varying the volumetric capacity of said actuator.

23. In a clutch actuator, a suction cylinder having a piston therein, an air chamber, means for establishing a difference in pressure on opposite sides of the piston to move the piston, means connecting the other side of the piston with said chamber to conduct air from the cylinder into the chamber until a predetermined pressure is established, and means for releasing the air in the chamber to cause further movement of the piston.

24. In a clutch actuator, a suction cylinder having a piston therein, an air chamber, means for applying suction to the chamber and cylinder at one end to move the piston, means connecting the chamber and other end of the cylinder, and a valve controlling the flow of air to said chamber from the cylinder, and for releasing air from the chamber.

25. In a clutch actuator, a suction cylinder having a piston therein, an air chamber, means for applying suction to the chamber and cylinder at one end to move the piston, a valve to control the application of suction through said means, means connecting the chamber and other end of the cylinder, a valve controlling the flow of air to said chamber from the cylinder and for releasing air from the chamber.

26. In a clutch actuator, a suction cylinder having a piston therein, an air chamber, means for applying suction to the chamber and cylinder at one end to move the piston, a valve to control the application of suction through said means, means connecting the chamber and other end of the cylinder, a valve controlling the flow of air to said chamber from the cylinder, and for releasing air from the chamber, and means interconnecting said valves for operating them from a common control.

GILBERT E. PORTER.